United States Patent

[11] 3,582,096

| [72] | Inventors | Robert L. Norton<br>Norfolk;<br>William H. Jacobs, Chestnut Hill, both of, Mass. |
|---|---|---|
| [21] | Appl. No. | 807,885 |
| [22] | Filed | Mar. 17, 1969 |
| [45] | Patented | June 1, 1971 |
| [73] | Assignee | Jet Spray Cooler, Inc.<br>Waltham, Mass. |

[54] GASKET ASSEMBLY FOR BEVERAGE DISPENSER
10 Claims, 3 Drawing Figs.
[52] U.S. Cl. .................................................... 277/237,
 285/437
[51] Int. Cl. .................................................... F16j 15/10
[50] Field of Search ............................................ 166/89;
 285/137; 277/237

[56] References Cited
UNITED STATES PATENTS

| 3,011,804 | 12/1961 | Burns | 285/137(A) |
| 3,170,607 | 2/1965 | Anthon | 285/137X |
| 3,471,178 | 10/1969 | Roe | 285/137 |

Primary Examiner—Laverne D. Geiger
Assistant Examiner—Robert I. Smith
Attorney—Wolf, Greenfield & Sachs ABSTRACT: A gasket assembly for crossing a wall that describes a differential pressure barrier and having a molded rubber body with a plurality of parallel sleeves and a connecting web, with the web sandwiched between a pair of plates that clamp the web to the wall. Ducts extend through the sleeves, and the pressure about the sleeves seal them against the ducts.

PATENTED JUN 1 1971

3,582,096

INVENTOR.
ROBERT L. NORTON
WILLIAM H. JACOBS
BY
Wolf, Greenfield, Hieken & Sacks 3,582,096

GASKET ASSEMBLY FOR BEVERAGE DISPENSER

This invention relates to gasket assemblies for crossing differential pressure barriers and is particularly suitable for use in equipment such as beverage dispensers having pressurized tanks for liquid.

At the present time there are a variety of gasket assemblies used to cross pressure barriers in equipment such as beverage dispensers having pressurized tanks. These assemblies include fittings for attaching ducts at opposite sides of the barrier, and they have many parts. They are often difficult to assemble and require an inventory of many different elements.

One important object of this invention is to provide a very simple gasket assembly which eliminates fittings and couplings for connecting ducts to its opposite sides and which has a minimum number of parts.

Another important object of this invention is to provide a gasket assembly which is self-sealing about the ducts which are threaded through its sleeves.

To accomplish these and other objects, the gasket assembly of this invention includes a plurality of rubberlike sleeves disposed generally parallel to one another and connected by a web integral therewith. The web is disposed at one end of the sleeves, and the web periphery is adapted to overlie the margin of an opening in a wall which defines the pressure barrier. A pair of plates serve as clamps to sandwich the web and squeeze it against the margins of the wall.

In the drawings

Figure 2:
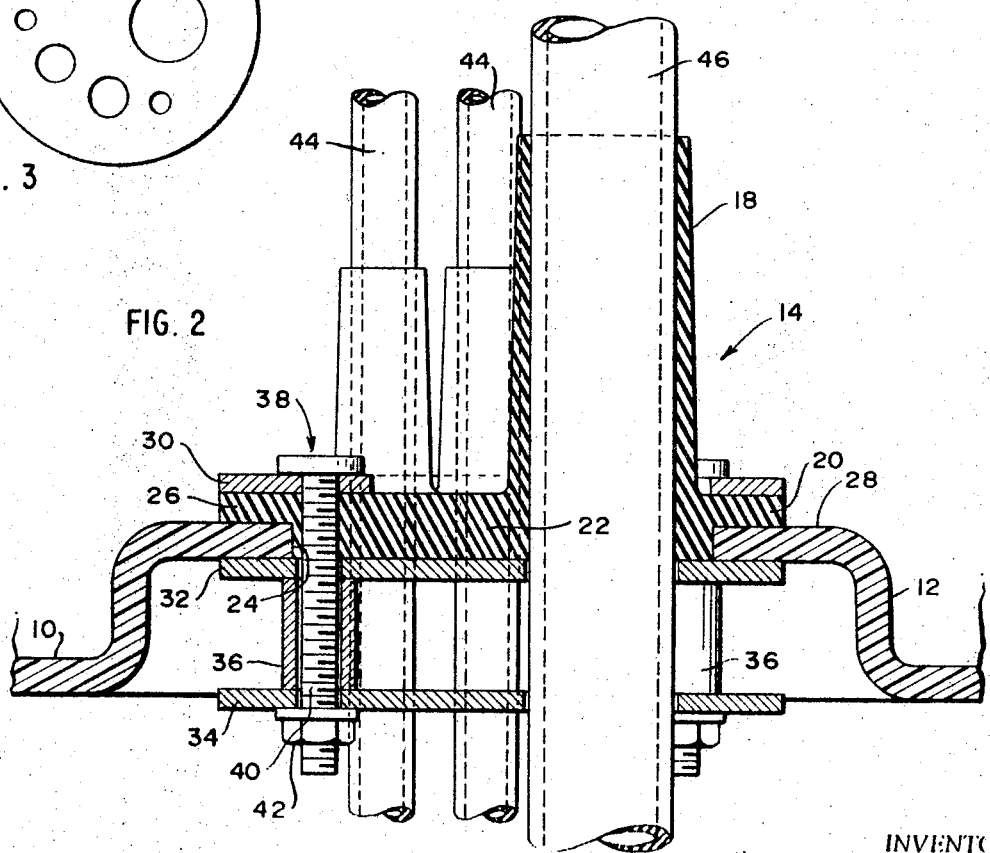
FIG. 2 is a cross-sectional view taken along the section line 2—2 of FIG. 1.

In FIG. 2, the gasket assembly 14 is shown as it may be used in a beverage dispenser. In that figure the bottom wall 10 of a beverage tank is shown, provided with an upwardly extending platform 12 to which the gasket assembly 14 is attached. Typically the tank may be of the variety shown in copending application Ser. No. 682,344 filed Nov. 13, 1967 entitled MULTIBEVERAGE DISPENSER used to cool both water and the flavor syrups which are combined to produce the beverage. In that particular beverage dispenser four different flavors are dispensed, and each flavor is mixed with carbonated water as it is discharged from the pressurized tank into the customer's cup. As the flavor syrups are refrigerated along with the water, it is evident that means must be provided to permit the syrups to enter and leave the tank as well to add and withdraw water from it. The gasket assembly of this invention is designed to perform just such a function, as it provides means for introducing water and flavor syrup into the tank as well as for discharging the water and the flavor syrups.

The gasket assembly 14 in the embodiment shown includes four sleeves 16 of equal diameter and height, and a fifth sleeve 18 of greater length and diameter than the sleeves 16. In the particular setting suggested, the sleeves 16 are used to introduce the flavor syrup ducts into the tank, while the sleeve 18 is used to introduce the water into it.

The five sleeves 16 and 18 are connected together by a web 20 disposed at one end of the sleeves. The web 20 is oriented generally perpendicular to each of the sleeves and is molded as an integral part thereof. It will be noted in FIG. 2 that the outer diameters of the sleeves 16 and 18 are somewhat tapered from the web 20 to their free ends, which allows for easy removal of the sleeves from the forming mold during fabrication.

Figure 1:
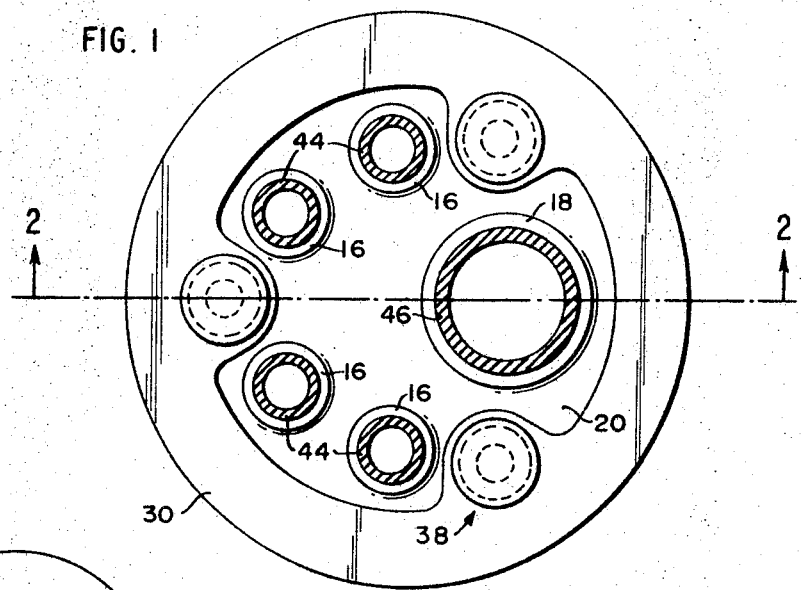
FIG. 1 is a top plan view of a gasket assembly constructed in accordance with this invention.
Figure 3:
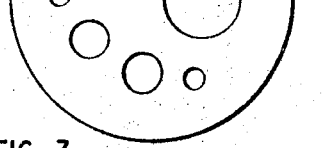
FIG. 3 is a plan view of the bottom plate of the assembly.

The web 20 has a somewhat thickened central body portion 22 having a diameter of the opening 24 in the platform 12 of the bowl so that when the gasket assembly is mounted in place, the thickened body portion sits in the opening 24 with the periphery 26 of the body resting on the upper surface 28 of the platform. A pair of plates 30 and 32 made of metal or some other relatively rigid material sandwich the web 20 of the assembly, and the plate 30 is provided with a somewhat irregular large central opening through which the various sleeves of the rubber body extend. The plate 32 as shown in FIG. 3 is provided with a series which are aligned with the openings in the web and form continuations of the various sleeves. Thus, the plate 32 in the embodiment shown has four openings 31 of a diameter substantially equal to the inner diameter of the sleeves 16 and a fifth opening 33 of somewhat larger diameter which generally conforms in size to the inner diameter of the sleeve 18. When assembled, the openings in the plate 32 are aligned with the openings in the sleeves so that the ducts may be inserted through the entire assembly. The plate 32 also is provided with three openings 35 through which the assembling screws extend, as described below.

When the assembly is designed to carry a large duct as shown in FIG. 2, a third plate 34 may be employed to stabilize that duct, i.e., to resist coupling forced against the duct which would otherwise cause it to pivot about the opening in the plate 32 through which it extends. The second plate 34 may be identical to the plate 32 and be supported on it by spacers 36.

In the embodiment shown, fasteners 38 in the form of screws 40 having their heads 41 secured to the flanges 43 on the plate 30, extend through openings 35 in the plates 32 and 34 and spacers 36, and the nuts 42 hold the entire assembly together. It is evident in FIG. 2 that the screws and nuts are tightened, the plates 30 and 32 will bind against the web 20 of the gasket to squeeze the periphery 26 of the web against the margins of the opening 24.

Extending through each of the sleeves 16 and 18 is a separate tube; that is, a duct 44 extends through each of the sleeves 16 while a larger duct 46 extends through the sleeve 18. The tubes may be made of metal, plastic, or some other material having sufficient rigidity to maintain their shape under pressure. The tubes 44 and 46 extend through the web 20 of the gasket as well as through the openings in the plates 32 and 34, and thus they bridge the pressure barrier defined by the wall 12.

In the installation described, the bowl 10 is pressurized, and therefore the pressure exerted against the outer surfaces of the sleeves exceeds the pressure present inside the sleeves which are exposed to ambient conditions outside the bowl. Consequently the pressurized atmosphere in the bowl causes the sleeves 16 and 18 to press against the ducts 44 and 46 so as to form a liquid tight seal about each. Therefore, no leakage can occur from the bowl through any of the sleeves because of the seal formed by them against each of the ducts. Thus, to achieve the self sealing action of the gasket assembly, the sleeves 18 should extend from the pressure barrier into the volume of greater pressure.

In the installation suggested in application Ser. No. 682,344, supra, two gasket assemblies of the general character described herein would be utilized. The assembly specifically shown in the drawings may be used to fill the tank with water and introduce the flavor syrup coils into the tank. The ducts 44 carry the flavor syrup, and it will be appreciated that they enter from outside the tank into it without any special couplings. The duct 46 may be used to introduce the water into the tank. The second assembly would be used to exit the ducts 44 from the tank and provide means for drawing water from it. Other sleeves may be provided for ducts to purge the tank, and introduce carbon dioxide for carbonating the water.

What we claim is:

1. A gasket assembly for crossing a wall describing a differential pressure barrier with a plurality of ducts comprising a plurality of rubberlike sleeves disposed generally parallel to one another and each adapted to have a duct extend axially through it, a web of rubberlike material formed integrally with and joining the sleeves in a plane generally perpendicular to the sleeves' axes and designed to lie substantially in the plane of the barrier and with the sleeves disposed on the side of the barrier with the higher pressure so that the pressure may urge the sleeves against ducts which extend through them to form a seal about the ducts, said web having openings therein aligned with the sleeve openings, and a pair of plates having openings therein through which the sleeves and ducts may extend and squeeze the web against one side of the wall, said sleeves extending through the openings and being exposed beyond the plates to the higher pressure on the side of the barrier.

2. A gasket assembly for crossing a wall as described in claim 1 further characterized by a third plate disposed parallel to at least one or the other of the plates and spaced from it, and an opening in the third plate for engaging and stabilizing a duct extending through one of the sleeves.

3. A gasket assembly as described in claim 1 further characterized by ducts extending through the sleeves.

4. A gasket assembly as described in claim 3 further characterized by said web being disposed at one end of the sleeves and with its periphery adapted to overlie the margin of an opening provided in the wall, said plates adapted to squeeze the periphery of the web against the margin of the opening, one of the plates having an opening aligned with each opening in the web.

5. A gasket assembly as described in claim 4 further characterized by a plurality of additional openings provided in the web and the plate against the side of the web opposite the sleeves and aligned therewith, and fasteners extending through the aligned openings for securing the assembly together.

6. A gasket assembly as described in claim 5 further characterized by a third plate disposed parallel to at least one or the other of the plates and spaced from it, an opening in the third plate for engaging and stabilizing a duct extending through one of the sleeves, and spacers disposed between the third and said one of the plates for maintaining the relationship of those plates.

7. A gasket assembly as described in claim 3 further characterized by said sleeves tapering in wall thickness from the web to their free ends.

8. A gasket assembly for crossing a wall describing a differential pressure barrier with a plurality of ducts comprising, a plurality of rubberlike sleeves disposed generally parallel to one another and each adapted to have a duct extend axially through it, a web of rubberlike material formed integrally with and joining the sleeves in a plane generally perpendicular to the sleeves' axes and designed to lie substantially in the plane of the barrier, mounting means engaging the web to support the web substantially in the plane of the barrier with the sleeves on the barrier side with the higher pressure and with the outer surfaces of the sleeves exposed to said pressure, relatively rigid ducts extending through the sleeves and capable of withstanding the pressure of the high-pressure side of the barrier without collapsing, said duct and sleeves being free of adhesive or mechanical couplings so that the ducts may be withdrawn from the sleeves without releasing adhesives or coupling means, said sleeves being adapted in response to the pressure on the high pressure side of the barrier to press against and form a seal about the outer surfaces of the ducts.

9. A gasket assembly as defined in claim 8 further characterized by said mounting means including a pair of plates which sandwich the web, openings in one of said plates designed to lie on the high-pressure side of the barrier through which said sleeves extend with the sleeves exposed beyond that plate on their outer surfaces to the high pressure.

10. A gasket assembly as described in claim 9 further characterized by a third plate disposed parallel to the other plates and spaced from them, and openings in the third plate through which the ducts extend for stabilizing said ducts.